United States Patent [19]
Sindelar

[11] 3,818,301
[45] June 18, 1974

[54] MULTIPLEXED MACHINE CONTROL APPARATUS
[75] Inventor: Emmett F. Sindelar, Moreland Hills, Ohio
[73] Assignee: The Warner & Swasey Company, Cleveland, Ohio
[22] Filed: May 3, 1973
[21] Appl. No.: 357,027

[52] U.S. Cl................. 318/574, 318/603, 318/625
[51] Int. Cl. .......................................... G05b 19/22
[58] Field of Search .......... 318/574, 600, 601, 603, 318/625

[56] References Cited
UNITED STATES PATENTS

| | | | |
|---|---|---|---|
| 3,063,311 | 11/1962 | Beckwith et al. | 318/574 X |
| 3,575,647 | 4/1971 | Levy | 318/625 |
| 3,596,153 | 7/1971 | Brainard et al. | 318/574 |
| 3,633,087 | 1/1972 | Vawter et al. | 318/574 X |
| 3,676,761 | 7/1972 | Fortune | 318/574 |

Primary Examiner—Gene Z. Rubinson

[57] ABSTRACT

A machine control apparatus has several machine members whose positions are to be controlled and has several servomechanism loops for controlling the members. Each servomechanism loop includes a controller, and switching is provided by which the inputs and outputs of the various controllers can be switched to control different ones of the movable machine members. Each controller has a data storage register for storing the instantaneous value of error signal of its servomechanism loop. Upon changeover of a particular member from one controller to another, the error signal data in the storage register of the outgoing controller is transferred to the error storage register of the incoming controller, so that the error signal data remains associated with the member being controlled, and no inaccuracies are introduced into the position of the controlled member.

20 Claims, 5 Drawing Figures

MULTIPLEXED MACHINE CONTROL APPARATUS

BACKGROUND OF THE INVENTION

This invention relates generally to control apparatus for machines, and more specifically to a control apparatus in which a plurality of controllers are used to control a plurality of movable members of a machine, with the conrollers being interchangeable to control different ones of the movable members in the course of performance of a job.

Numerical controls for machine tools are relatively complex and contribute substantially to the complexity of a complete numerically controlled machine tool. This is particularly true of the more sophisticated machine tools having two or more directions of possible movement of two or more movable members, so that a total of four or more possible movements or "axes" altogether must be controlled.

One such machine tool is a four-axis turret lathe. A four-axis turret lathe has two turrets, each movable along two control axes. A four-axis controller permits both of the turrets to be used simultaneously. This type of machine usage of tools on the turrets is referred to in the art as making combined cuts. When the geometry of a workpiece permits the making of combined cuts, the relatively complex four-axis controllers are desirable, to enable both turrets to be used simultaneously, and their complexity is justifiable. However, many workpieces have a geometry such that the making of combined cuts is not practical and may even be impossible. Also, sophisticated controller programming is required to coordinate the simultaneous movement of the two turrets to make combined cuts.

In an attempt to simplify control systems, a lathe has been provided in the prior art with two turrets which are mounted on a single slide. Although this approach provides more tool stations, it has many of the tooling disadvantages of a single-turret machine, such as long overhang of a turning tool.

In another effort to simplify the numerical control apparatus and at the same time preserve the versatility provided by two turrets (four axes), one control system of the prior art utilized a two-axis control which could be selectively used to control one turret at a time of a two-turret machine. This system is described in a patent application for Machine Tool by D. R. Gugliotta, Ser. No. 280,870, which is assigned to the assignee of the present invention. By utilizing a two-axis controller to selectively control either axis pair of a four-axis machine tool the Gugliotta system reduced the amount of equipment required for the controls. This was accomplished by utilizing at least some of the control elements to control the movement of the two turrets alternatively.

Specifically, the control apparatus of the prior art Gugliotta apparatus included an error signal generator which could be connected in a first servoloop to control the movement of a side turret along one of its two axes (called the X-axis) and could later be connected in a second servoloop to control the movement of an end turret along one of its two axes, (called the U-axis). At the same time that this error signal generator was switched from controlling the side turret to controlling the end turret, a second error signal generator was switched from a servoloop for controlling movement of the side turret relative to another of its axes (the Z-axis) to a servoloop for controlling movement of the end turret relative to another of its axes (the W-axis). Since the two error signal generators were simultaneously switched between servoloops associated with the side turret and servoloops associated with the end turret, only one of the two turrets could be controlled at a time. Whichever turret was parked, was held stationary by a brake.

Machines of the prior art which switch controllers from one turret to another have problems which cause inaccuracies in operation. At the time of substitution of one controller for another (for controlling the movement of one turret on one of its axes,) the "outgoing" controller, which is being displaced, could contain an error signal in its error register which has not as yet been reduced to zero by operation of the controller. When the outgoing controller is removed from control of the turret, the error signal goes with the outgoing controller or else that signal is reset to zero, and is therefore lost, so far as the controlled turret is concerned. The "incoming" controller, which is taking over control of the turret, enters with a zero error signal, or perhaps with some other error signal left over in its error register from an immediately previous control task, and relating to a different turret, and therefore inappropriate for the new turret which the incoming controller is to begin controlling. In the prior art, an uncorrted error signal is therefore taken away from the member being controlled, and no opportunity is ever provided to eradicate that error signal by corrective movement of the controlled member. As a result, inaccuracies in position of a controlled member can be introduced whenever the member is changed over from one controller to another.

Still another prior art system, not a switchable one, is described below in the Description of a Preferred Embodiment to assist in describing the present invention.

SUMMARY OF THE INVENTION

In the present invention position errors caused by a changeover from one controller to another are minimized or eliminated. Preferably two embodiments of the invention are employed simultaneously. A first embodiment employed involves delaying the actual changeover until such time as the error signal in the outgoing controller is zero. Therefore, at the instant that the outgoing controller departs from its controlling role, a first movable member which is being controlled by it, has a zero error of position. It is necessary then only to set the incoming controller's error register to a zero error signal, to avoid position errors. The incoming controller controls the first movable member thereafter with no starting inaccuracy, because the error signal register of the incoming controller exactly matches the actual error in position of the first movable member, both the actual error and the error signal being zero.

A second embodiment of the invention for eliminating inaccuracy resulting from transfer of controllers, preferably employed in the same machine together with the first embodiment, applies to a second movable member which occasionally exchanges controllers with the first movable member upon command. The second embodiment involves presetting data into the error signal register of the incoming controller of the second movable member which represents an error exactly equal to the actual position error of the second movable member at the time of changeover. Data representing the actual position error of the second movable member at the time of changeover can be found in the error signal register of the outgoing controller of the second member. According to the second embodiment of the present invention, the error signal data in the error signal register of the second member's outgoing controller is transferred, at the time of changeover of controllers, into the error signal register of the incoming controller which is to start controlling the second member. The data in the incoming controller is consequently an accurate representation of the actual status of the second movable member when the incoming controller undertakes its new controlling function. The transfer of data is a jam transfer, in which previous data in the error register is erased or written-over, with the new data taking its place.

The first embodiment, namely that of delaying the changeover until the contents of the error register of the outgoing controller are zero and then presetting the error register of the incoming controller to zero, is a special case of the second, more general, embodiment in which the error signal of the outgoing controller is transferred to the error register of the incoming controller irrespective of whether that error signal is zero or non-zero. The first embodiment requires that the changeover be delayed until such time as a zero error signal actually occurs in the outgoing controller, but no such delay is required for the second embodiment above.

Preferably, a first controller called a park controller is provided for parking whatever machine member it is connected to, that is, for holding a member stationary in a desired fixed position. A second controller called a dynamic controller is provided for moving whatever machine member it is connected to, in accordance with commands that change ith time.

The manner in which both of the two above-described embodiments of the invention for eliminating position errors upon a changeover are employed cooperatively in the same apparatus is as follows. After a command is received to exchange controllers between the two members being controlled, a short time delay ensues after which the first member, which had been controlled by the first controller, changes from a park mode of control to a dynamic mode, and the second member changes from a dynamic mode to a park mode. The exchange or changeover of controllers is delayed following the command until the error signal in an error signal register of the first controller becomes zero. Then the controllers are exchanged between the controlled members, and at that time the error register of the second controller is reset to zero, and the error register of the first controller is preset to the pre-changeover data contents of the error register of the second controller.

A preferred arrangement of the present invention also employs a technique for avoiding position errors that might otherwise occur due to loss of a command signal pulse or a position feedback pulse resulting from occurrence of either such pulse during servo changeover switching. In the preferred arrangement command pulses and feedback pulses are normally gated into an error register during different phase intervals of a clock, to prevent them from overlapping. During a changeover of controllers, the production of command signals is inhibited, and the changeover switching is performed during the phase interval normally employed for gating the command signals. Consequently no pulses of either type are lost.

Accordingly, one object of the present invention is to provide a machine control apparatus having a movable member whose position is to be controlled and two servomechanisms for controlling it, in which the two servomechanisms can be selectively switched so that either one of them selectively may control the position of the member, and in which each of the servomechanisms has a register for storing error signal data relative to the positional error of the member, means being provided for transferring the error signal data from one of the data registers to the other register at the time that control of the movable member is being changed over from one servomechanism to the other.

Another object of the invention is to provide a machine control apparatus having a plurality of movable members, all of whose positions are to be controlled, and a plurality of servomechanisms for controlling them. The various servomechanisms are selectively associated with the various members to be controlled, by switching. Upon switching of servomechanisms to control different members, the data stored in a servomechanism regarding the position of its previously associated member is transferred to the servomechanism that is newly associated with that same member, so that the respective error signal data remains associated with the member to which it relates.

Another object of the invention is to provide apparatus as above and in which a changeover of controllers is delayed until the error signal data in a servomechanism has a zero value.

A further object is to provide a machine control apparatus as above in which the various servomechanisms differ from each other and in which one of the servomechanisms has greater data storage capacity for storing the error signal data than does another of the servomechanisms to which data is to be transferred, and in which the changeover switching from one servomechanism to another is delayed until the error signal data of the servomechanism having the greater data storage capacity becomes small enough to be accommodated in the servomechanism which has smaller data storage capacity.

Still another object is to provide apparatus as above and in which the exchanging of servomechanisms for controlling different movable members is delayed until both the above-described condition regarding storage capacity is fulfilled and the error signal data in one of the controllers reaches zero.

Another object is to provide a machine control apparatus as above in which one or more of the servomechanisms maintains its associated movable member in a stationary position and in which one or more of the servomechanisms is controlled by command signals calling for movement of the machine member which it controls.

Still other objects include providing apparatus as above which is operated digitally in cyclic timing intervals and in which the switching from one servomechanism to another occurs only at a predetermined phase of the cyclic interval and in such a sequence as to prevent losing either a command pulse signal or a feedback pulse signal.

A further object of the invention is to provide a multiplexed positioning apparatus some of whose components are used in common for controlling two or more machine members which share the common elements on a time basis.

Further objects of the invention are to provide methods for accomplishing the functions of the foregoing apparatus.

BRIEF DESCRIPTION OF THE DRAWINGS

The foregoing and other objects and features of the present invention will become more apparent upon consideration of the following description taken in conjunction with the accompanying drawings wherein.

DESCRIPTION OF A PREFERRED EMBODIMENT

Figure 1:
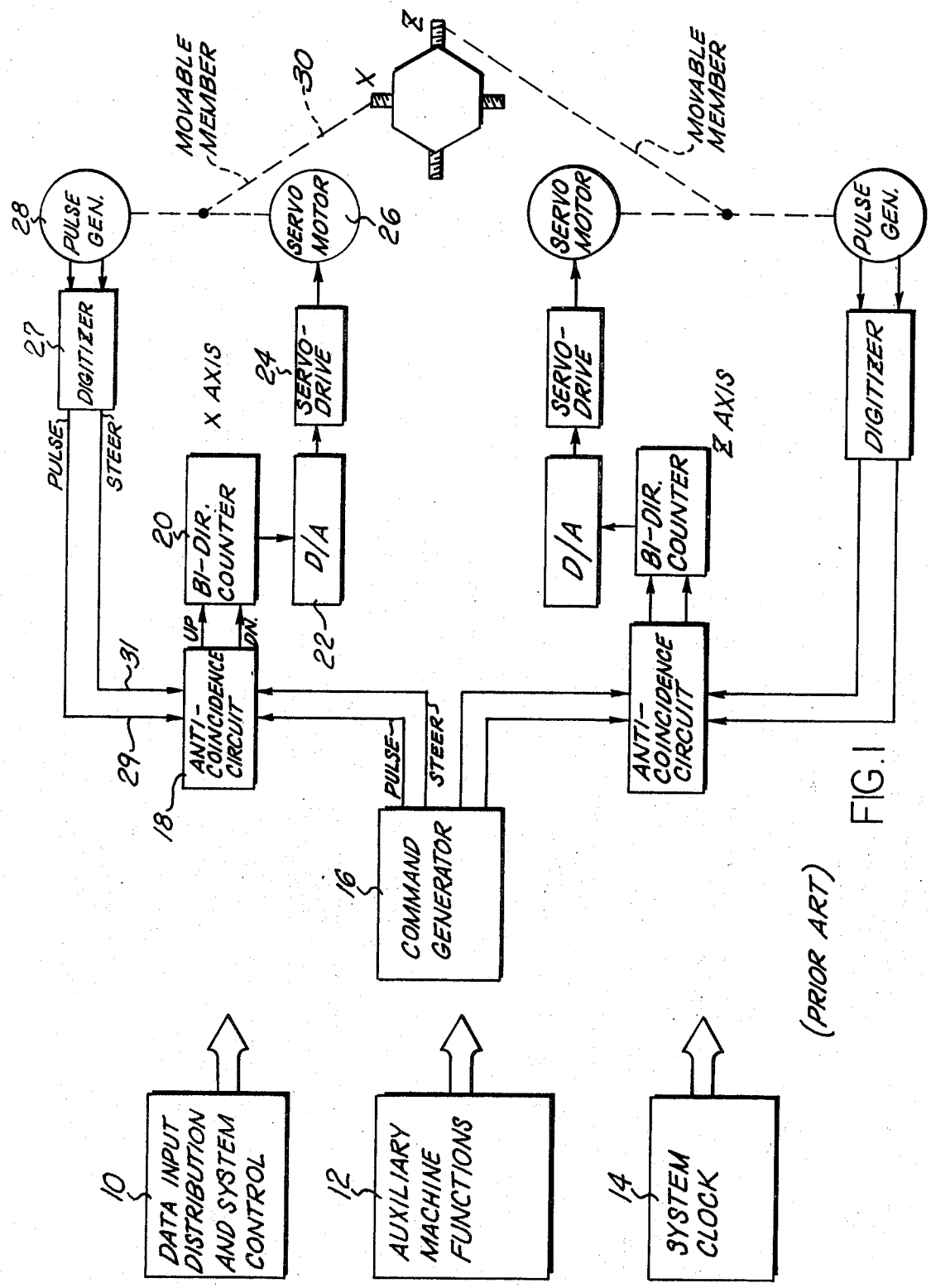
FIG. 1 is a block diagram of an unswitched two-axis, contouring control system of the prior art that utilizes digital feedback.

A preferred embodiment of the present invention is employed for controlling both turrets of a two-turret lathe, one turret being parked while the other is moved. It is helpful first, however, to review a simpler prior art system of FIG. 1, which is a digital system for controlling only one turret of a turret lathe. Many components of the system of FIG. 1 are similar or identical to components of the preferred embodiment of the present invention, as will become apparent hereafter. The turret being controlled in FIG. 1 is typically a side turret carrying a number of tools for operating on a work piece which is rotated by a spindle of the lathe. The turret is movable in a direction (called the X-axis) transverse to the spindle axis, and is movable also on a second axis (called the Z-axis), which is parallel to the longitudinal axis of the spindle.

The prior art system of FIG. 1 has a Data Input Distribution and System Control block 10, which represents a tape reader or a computer and which also includes parity checking circuits, character recognition circuits and other known logic circuits and registers, along with manual data input devices for entering data into the controller. The turret is under the control either of command data which can be entered manually by an operator, or of data that is programmed to control automatically the motion of the turret on the X axis and the Z axis. The Auxiliary Machine Functions block 12 includes decoders and registers, for decoding and storing auxiliary data such as turret face selection and offset selection, coolant on and off data, etc. The block identified as a System Clock 14, includes a crystal controlled oscillator along with associated digital dividers and logic gating circuits, for producing a plurality of symmetrical and asymmetrical clock signals that are required by the control system.

The Command Generator 16 of FIG. 1 distributes pulses in real time to the X axis and Z axis controllers to produce the desired motions of the cutting tools. The Anti-Coincidence Circuit 18 functions merely to prevent either a command pulse or a feedback pulse from being lost in the event that the two occur simultaneously or overlap. Each Bi-Directional Counter 20 (up-down counter) acts as an accumulating register to produce a digital position error signal. The digital position error signal is converted by a digital-to-analog converter (D/A) 22 to an analog voltage position error signal, which is used as an input signal to a servo drive amplifier 24. The servo drive amplifier 24 drives the servo motor 26 in a forward or reverse direction as determined by the sign of the analog position error signal, at a velocity that is proportional to the analog position error signal. The motor 26 moves a movable member 30 on the controlled axis. A feedback pulse generator 28 produces a pair of phase-displaced binary signals. The phased-displaced signals are converted by a digitizer 27 into a series of pulses on a line 29. A single pulse is produced each time the member 30 is moved the basic increment of distance. The digitizer 27 also produces a binary steering signal, on a line 31, that indicates the direction of motion of the controlled member 30. The command generator 16 enters commands as error signals into the bidirectional counter 20. Thereupon, the error signal operates the motor 26 to eliminate the error. Feedback pulses on the line 29, count down the counter 20 to a zero error signal, and the motor 26 stops. The Z-axis servoloop is similar to the X-axis loop. All of the foregoing features of FIG. 1 are well known in the art, and serve as a starting point for describing below a preferred embodiment of the invention.

Figure 2:
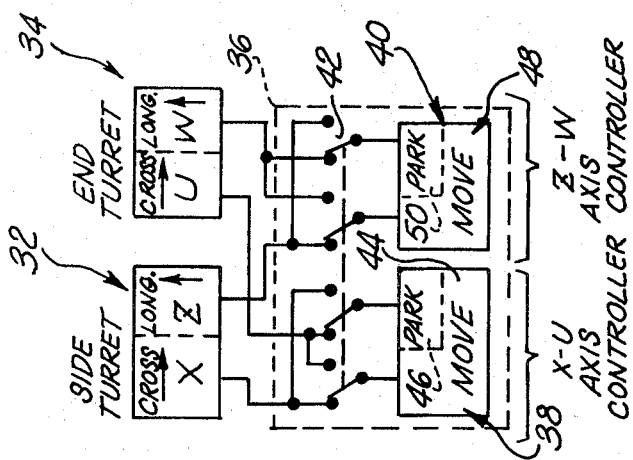
FIG. 2 is a simplified block diagram of a preferred embodiment of the present invention showing two turrets each having two motion axes, and two complete sets of controls, each containing a park controller and a motion controller.

In the preferred embodiment, a turret lathe has two turrets 32, 34 one at a side of the lathe bed and another at the end, respectively, FIG. 2. The relationships between the two turrets and the controllers of the present invention are indicated conceptually in the one-line diagram of FIG. 2. Each turret is movable in two orthogonal directions. Thus, in the four-axis turret lathe, there are four controlled axes, two for each turret. By convention, the side turret axes are denominated the X and Z axes, the X axis being perpendicular to the spindle's centerline, and the Z axis being parallel to the spindle's centerline. The two axes for the end turret are denominated the U axis and the W axis, the U axis being perpendicular to the spindle's centerline and the W axis being parallel to the spindle's centerline.

When the side turret is in use, the end turret is parked, and vice versa. The present invention permits the operation of the four-axis turret lathe by a control system that is basically a two-axis system except that some duplicate components are provided in order that the two axes of the parked or currently stationary turret may be maintained in a parked position by closed loop servomechanisms. There are four servo loops, two of which are used for parking and are simpler than the dynamic ones.

Movement of the turrets along their axes is controlled by a control system 36 which includes two identical controllers 38, 40. The control system 36 includes switching means 42 for connecting the controllers 38, 40 to the turrets 32, 34 in different ways. The controller 40 is used for controlling only the Z and W axes, that is, the longitudinal axes on the side and end turrets respectively. The controller 40 has two major portions or servos, the principal portion being a motion controller or dynamic controller 48 which is used for moving one turret at a time on one axis at a time. The other portion is a park controller 50 which is used for holding one turret at a time in a stationary or parked position on one of its axes. Similarly, the controller 38, which is for controlling the X and U axes of the side and end turrets respectively, has two portions, one of which is a motion controller or dynamic controller 44 and the other of which is a park controller 46.

In the preferred embodiment, both the park controller and the dynamic controller are always active to control one turret or another, so that no controller becomes inactive upon a changeover. The two controllers merely interchange turrets so that, for example, when one turret changes from dynamic mode to park mode, that turret relinquishes the dynamic controller and becomes associated instead with the park controller, and the converse occurs at the same time for the turret which had been in a park mode before the changeover.

In the embodiment described, the first technique for eliminating inaccuracies, in which a changeover of controllers is delayed until the outgoing controller has a zero error signal in its error register, is employed for a movable member which has been in a parking mode of control before the changeover and is in a dynamic mode of control after the changeover. For the same changeover, the second technique for eliminating inaccuracies is employed for the movable member which was being controlled in a dynamic mode before the changeover and is controlled in a parking mode after the changeover.

The controller employed for parking a turret is somewhat different than the controller employed for moving the turret in a dynamic mode of operation under the control of a varying program, one of the differences being that the number of digits in the error signal register is greater for the dynamic controller than in the park controller. Consequently, when error signal data is being transferred from an outgoing dynamic controller to the error register of an incoming park mode controller, it is necessary to monitor the data contents of the dynamic controller and, if necessary, delay the changeover until the error signal is small enough to be accommodated in the smaller register of the park controller.

The switching means 42 as depicted in FIG. 2, is merely symbolic of static switching circuits employed in the preferred embodiment. At one time the switching means 42 connects the dynamic controller 44 to the X axis drive of the side turret 32, connects the park controller 46 to the U axis drive of the end turret 34, connects the dynamic controller 48 to the Z axis drive of the side turret 32, and connects the park controller 50 to the W axis drive of the end turret 34, as shown in FIG. 2. At other times, instead, the switching means 42 connects the dynamic controller 44 to the U axis drive of the end turret 34, the park controller 46 to the X axis drive of the side turret 32, the dynamic controller 48 to the W axis drive of the end turret 34, and the park controller 50 to the Z axis drive of the side turret 32. Accordingly, in one position of the switching means 42 the side turret 32 is movable by the dynamic controllers on both of its axes, while the end turret 34 is held parked in both of its axes by the park controllers; in the other position the end turret 34 is movable in both of its axial direction and the side turret 32 is parked in both of its axial directions.

Although only one turret at a time is used, each of the four controllers 44, 46, 48, 50 operates at all times in a closed loop servomechanism, so that all four of the axis drives X, Z, U, W, are controlled simultaneously. The park controllers 46 and 50 are relatively small and inexpensive, so four-axis control is achieved even though full-scale controllers, (namely the motion controllers 44 and 48,) are provided for only two axes.

Figure 3:
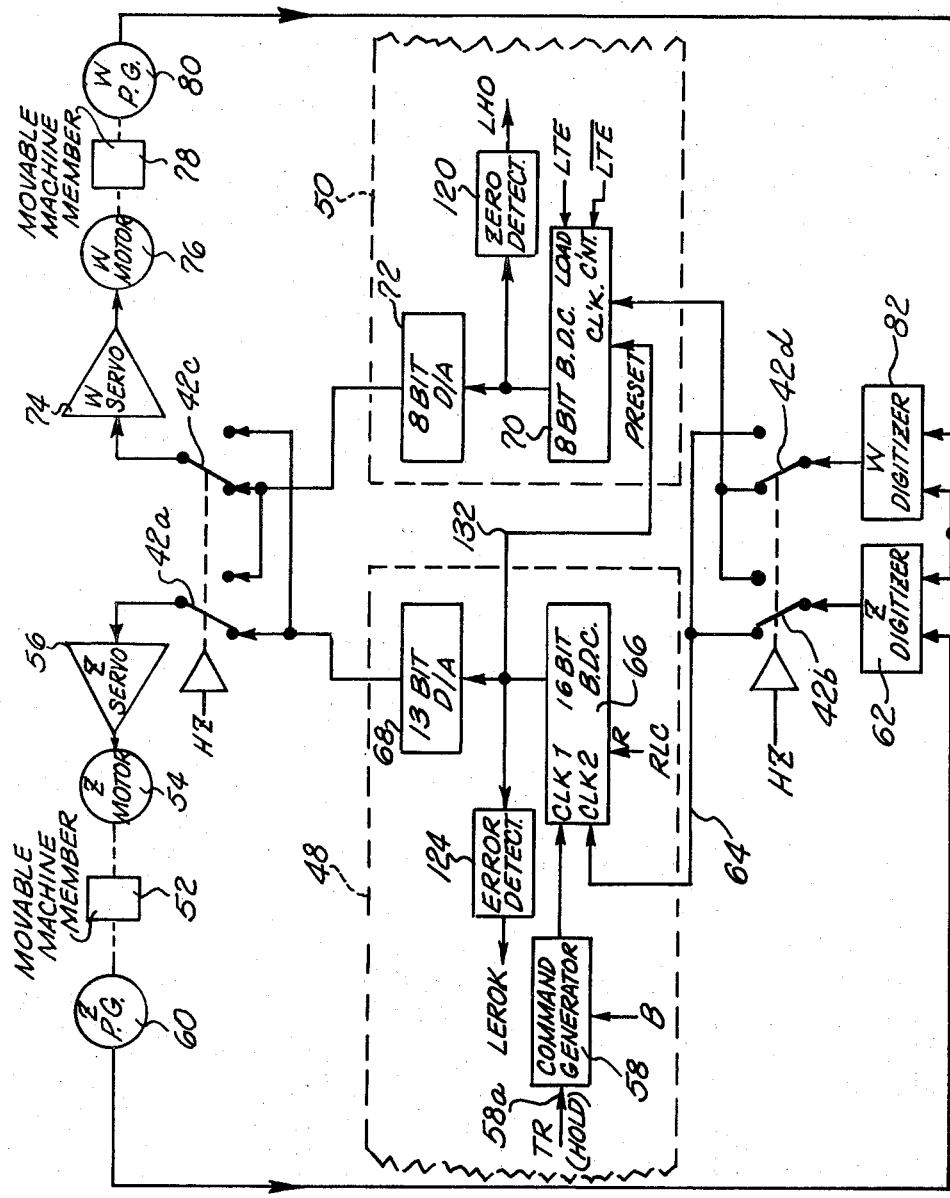
FIG. 3 is a block diagram of only one of the two complete sets of controls of FIG. 2, namely Z and W axis controls, and showing a park controller servomechanism, a dynamic controller servomechanism, and two movable machine members which are simultaneously controlled by the two controllers.

Control servoloops for the Z and W axes are shown in more detail in FIG. 3. Controls for the X and U axes are identical to the controls for the Z and W axes, and consequently are not described in detail herein.

A movable machine member 52, FIG. 3, is mechanically arranged for moving the side turret 32 along its Z axis. It is driven by a Z axis motor 54 which receives analog electrical signals from a Z axis servo amplifier 56. Input signals for the Z axis servo amplifier 56 are received through static switching devices which are symbolized by the switch symbol 42a. When the switch 42a is in the position shown in FIG. 3, the Z servo amplifier 56 receives its input signals from the dynamic controller 48. The controller 48 includes provision for motion commands from a command generator 58. Feedback signals from the movable member 52 are generated by a Z axis pulse generator 60 which transmits its output pulses to a Z axis digitizer 62. Binary output signals of the Z axis digitizer 62, which are similar to output signals from the digitizer 27 of the prior art system of FIG. 1, are connected to static switching circuits symbolized by the switch 42b. When the switch 42b is in the leftward position as shown in FIG. 3, binary signals from the Z digitizer 62 are connected to an input line 64 of the dynamic controller 48. Pulses on the line 64, which represent changes in position of the movable member 52, are applied to one counting input of a bi-directional counter 66. The command generator 58 also applies pulses to the bi-directional counter 66, which represent desired changes in the position of the movable member 52. The command pulses and feedback pulses applied to the bi-directional counter 66 either increase or decrease the data contents of the counter 66, depending upon direction signals which accompany the pulses. The data contents of the bi-directional counter 66 represent an error signal which is a difference between a commanded position of the movable member 52 and its actual position.

The bi-directional counter 66 transmits digital signals to a digital-to-analog converter (D/A) 68 which converts the digital signals to analog signals for application to the switch 42a.

In the routine operation of the servo-mechanism that includes the motion controller 48, commands from the command generator 58 are entered into the bi-directional counter 66, giving the contents of the bi-directional counter a non-zero value which represents an error signal. This error signal, after conversion to an analog form by the D/A 68, is transmitted through static switching circuitry 42a to the Z axis servo amplifier 56, whose output drives the Z axis motor 54. The Z axis motor moves the movable machine member 52 in a direction that is commanded by the sign of the error signal. As the movable member 52 moves, the Z axis pulse generator 60, which is mechanically connected with the movable member 52, produces pulses indicating incremental accomplishment of the commanded motion as the motion proceeds. The pulses from the pulse generator 60, after they are digitized in the Z digitizer 62, are transmitted to the input line 64 of the bi-directional counter 66, along with a direction signal not shown. The feedback pulses count the bi-directional counter 66 in the opposite direction to the command pulses which gave rise to the motion initially; consequently, the bi-directional counter 66, which is sometimes called an up-down counter, has its data contents reduced step-by-step, as the feedback pulses on the line 64 are received at the bi-directional counter 66. When the movable member 52 has accomplished the entire amount of change of position that was dictated initially by the command generator 58, the bi-directional counter contains a zero error signal. As a result, the input signal to the Z axis servo amplifier 56 becomes zero, and no further motion of the movable member 52 occurs.

If the movable member 52 were to be deflected slightly from its position by externally applied mechanical forces while the contents of the bi-directional counter 66 were zero, the deflection motion of the movable member 52 would cause the Z axis pulse generator 60 to produce pulses which, after digitization, would enter the bi-directional counter 66 and create an error signal. The command generator 58 not having produced any signals whatsoever meanwhile, the error signal in the bi-directional counter 66 would produce an input signal to the Z axis servo amplifier 56, which would bring the movable member 52 back to its correct position after the applied mechanical force is removed. The feedback pulses produced during return to the correct position would enter the bi-directional counter 66 with an opposite sign from the sign of the feedback pulses that originally established the error signal in that counter, and the counter contents would become zero.

The park controller 50 is similar to and operated in the same manner as the dynamic controller 48 except that the park controller 50 does not have a command signal. The park controller 50 does, nevertheless, have provision for presetting an error signal into its bi-directional counter 70. The counter 70 has only a partial range capacity of 8 bits, as contrasted with the 16 bit full-range capacity of the counter 66 in the more elaborate controller 48. The data contents of the bi-directional counter 70 are converted to an analog signal by a D/A 72, and applied through static switching which is symbolized by the switch diagram 42c to a W axis servo amplifier 74. An output signal from the servo amplifier 74 drives a bi-directional W axis motor 76 to control the position of a movable machine member 78, which moves the end turret in the W axis direction. Feedback pulses are produced by a W axis pulse generator 80 upon motion of the movable member 78. These feedback pulses are digitized in a W axis digitizer 82 and then conducted through static switching circuitry 42d to an input terminal of the bi-directional counter 70, where they are accummulated to produce an error signal or eradicate an error signal.

The park controller 50 maintains the movable member 78 in a parked position by closed loop servomechanism action when externally applied mechanical forces tend to deflect the movable member 78 of the W axis. Thus, the error signal in the bi-directional counter 70 does not remain zero at all times, but does return to a zero value quickly after occurrence of a non-zero error signal during parking control of a turret. The error signal in the bi-directional counter 70 represents accurately the actual position of the movable member 78 at all times; it represents that position in the form of the amount by which that actual position differs from a desired constant position.

After the side turret 32 has performed a work operation upon a workpiece in the turret lathe, the work procedure may call for parking the side turret 32 and moving the end turret 34, in accordance with certain commands, to perform a subsequent operation upon the workpiece. This necessitates connecting the dynamic controller 48 to control the movable member 78, which represents the W axis of the end turret 34. At the same time the other movable member 52, representing the Z axis of the side turret 32, must be changed over to the park controller 50. The change is necessary because the park controller does not have capability for controlling variable or programmable movements.

The changeover of the controllers 48, 50 is accomplished by operating the switches 42a, 42b, 42c and 42d of FIG. 3 to the other position from that shown in FIG. 3. To assist in making the invention clear, a few paragraphs are devoted first to describing certain problems that would exist upon changeover if the invention were not employed. If the static switches 42 were operated immediately upon occurrence of a changeover request, and with no attention to presetting of the error registers 66, 70, the actual changeover might occur at a time when the park controller 50 happened to have an uncorrected or non-zero error signal in its bi-directional counter 70. The existance of such an error signal would mean that the movable member 78 actually has an error in position at that time, because the binary counter 70 contains an accurate representation of the position of the movable member 78. Upon connection of the dynamic controller 48 for controlling the movable member 78, this small position error of the movable member 78, existing immediately before and after the changeover, would not be properly represented in the bi-directional counter 66 of the incoming dynamic controller 48. As a result an inaccuracy in position would have been introduced into the system.

Another reason for not executing the changeover of controllers immediately upon receipt of a command for changeover and without any presetting of registers 66, 70, is that the error signal in the bi-directional counter 66 of the dynamic controller 48 may not be zero at the instant of occurrence of the changeover command. Absent any manipulation of the data, these data contents would then be employed to move the movable member 78 to an incorrect position. Thus two possible sources of error of the position of the movable member 78 exist, one being the residual uncorrected error in position of the member 78 at the instant of the changeover, and the second being a residual error signal lying in the bi-directional counter 66 and representing an error of the movable member 52, but which, after the changeover, would be erroneously associated instead with the movable member 78.

At the same time, identical problems exist with respect to the accuracy of control of the movable member 52, upon the changeover. That is, member 52 may have a residual error in its position at the time of the changeover, and it may also inherit an unrelated error signal when it becomes associated with the bi-directional counter 70 immediately after the changeover.

Yet another potential problem which could introduce inaccuracy upon interchange of the controllers between the movable members 52 and 78 is solved by the present invention. It is that the actual changeover must occur at such a time and in such a way that no pulses, either command pulses or feedback pulses, will be lost if they happen to occur at the time of the changeover switching.

The foregoing problems are solved by performing the changeover in a particular way and in a particular sequence, now to be described. The objective of the sequence is to accomplish the changeover of controllers without introducing any errors into the positional control of either of the movable members 52, 78.

The changeover sequence is as follows:
1. A request to change turrets occurs in the program.
2. The changeover is inhibited until the error in the full-range bi-directional counter 66 is within the capacity of the partial-range bi-directional counter 70.
3. Moreover, the changeover is inhibited or delayed until the error in the partial-range bi-directional counter 70 becomes zero.
4. Further, the changeover is inhibited until occurrence of a proper phase of a clock signal.
5. The controllers 48 and 50 are then interchanged by the static switching means 42, to associate them with opposite ones of the movable members 52, 78.
6. Almost simultaneously with the changeover of the switching of the controllers, any error data that was in the full-range bi-directional counter 66 before the changeover is transferred to the partial-range bi-directional counter 70, as a preset.
7. The full-range bi-directional counter 66 is reset to zero immediately after its previous contents are transferred to the partial-range bi-directional counter 70.
8. Command information is enabled to flow to the bi-directional counter 66 in a normal fashion, the changeover of controllers having been completed.

It should be noted that immediately after the changeover, the error signal in the bi-directional counter 66 is zero, which is exactly equal to the actual position error of the movable member 78 at the time of changeover, because the changeover was delayed until such time as the actual position error of the movable member 78 was zero. Also immediately after the changeover, the error signal in the partial range bi-directional counter 70, although not zero, is exactly equal to the actual position error of the movable member 52 which it is thereafter intended to control, because a digital representation of the actual position error of the movable member 52 was preset into the bi-directional counter 70 at the time of the changeover. Changeover can be accomplished by the foregoing sequence without introducing any offset errors into the positions of either of the movable members 52 or 78. Continuous closed-loop servo control of all axes is maintained all the while.

At the same time as the aforedescribed changeover involving the Z and W axes, the other, identical, controller 38 performs a similar changeover of control functions for the X and U axes, so that both axes of the side turret 32 became parked and both axes of the end turret 34 come under variable control of the dynamic controllers.

Figure 4:
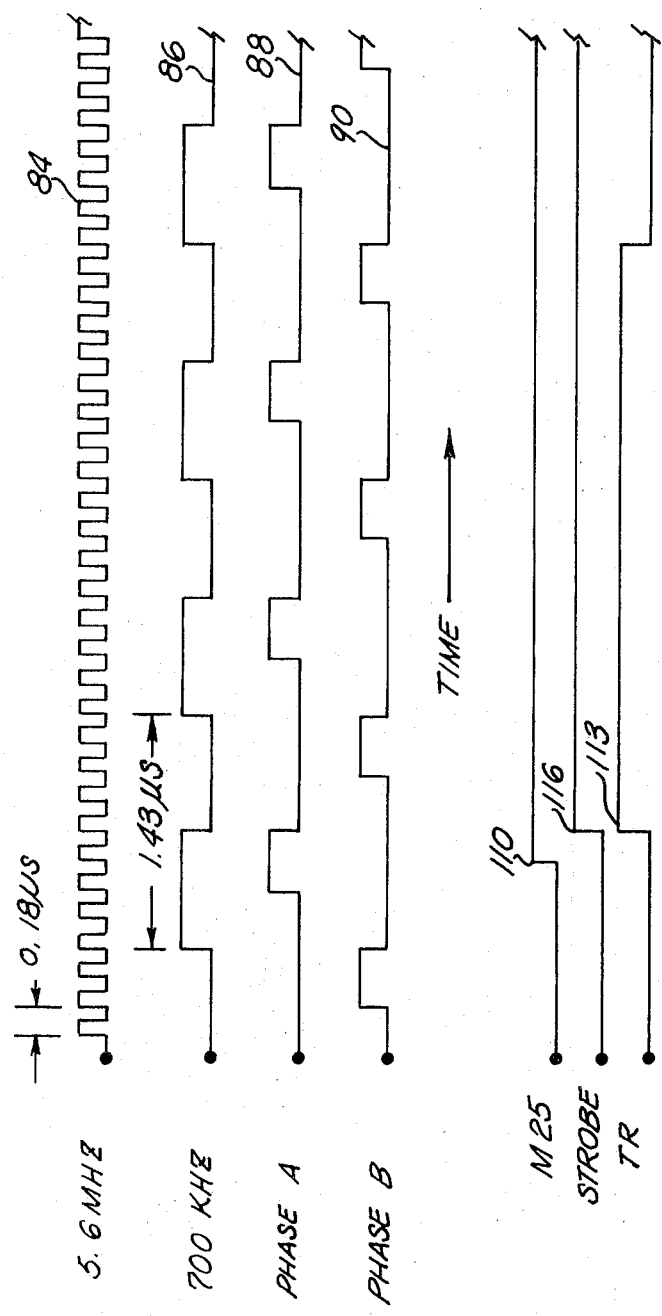
FIG. 4 is a timing diagram showing clock signals and certain operating signals of the apparatus of FIG. 3.
Figure 5:
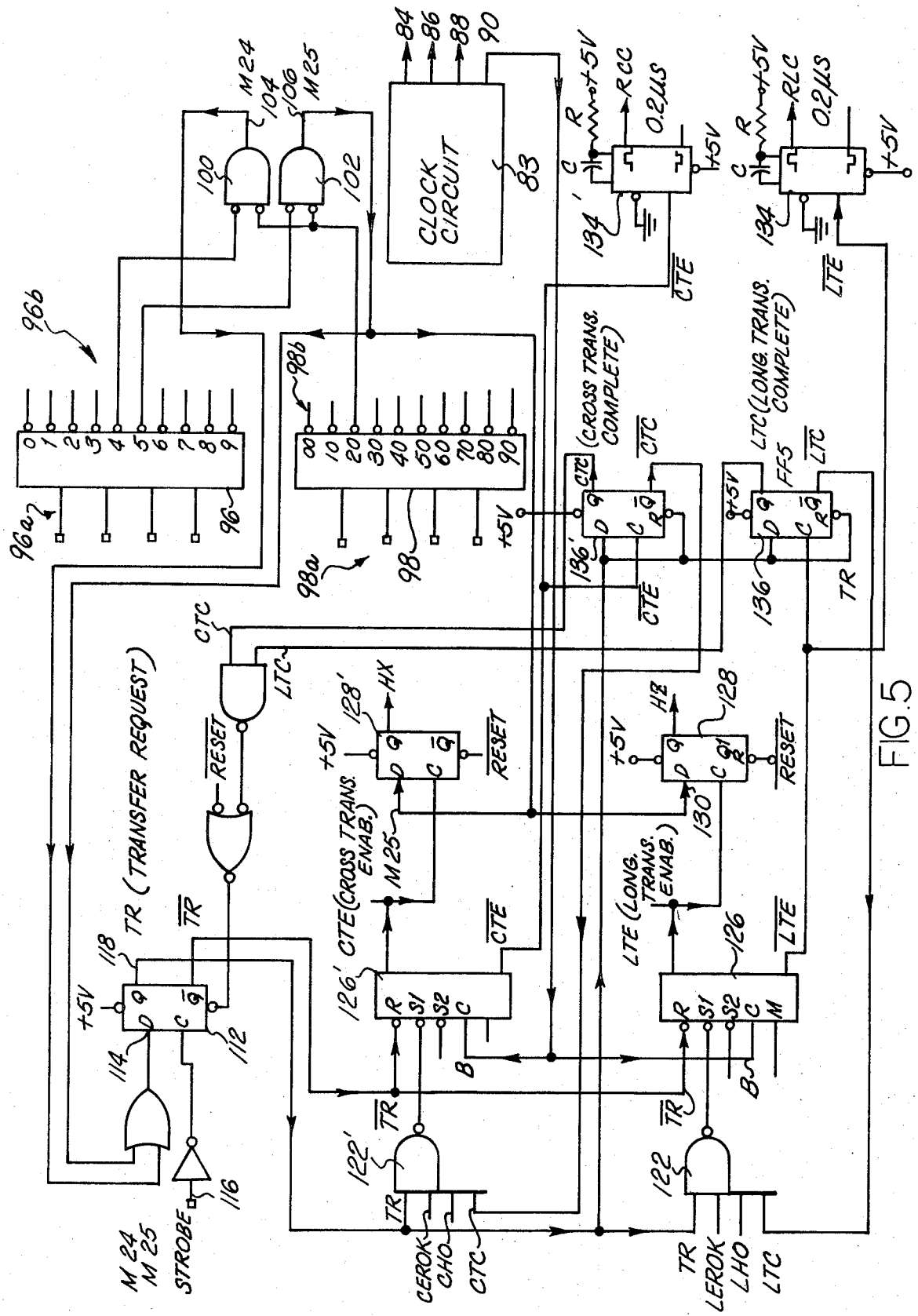
FIG. 5 contains logic circuit diagrams of various portions of the equipment of FIG. 3.

The various steps of the foregoing sequence for interchanging controllers is carried out by the equipment of FIG. 3 under the control of timing signals shown on FIG. 4 and of logic circuits shown on FIG. 5.

A time sequence of operation of the circuits of FIG. 5 is best understood by first taking note of the timing signals shown on FIG. 4, which are produced by a system clock circuit 83. A clock oscillator of the circuit 83 is used to generate a primary clock signal 84 having a frequency of 5.6 MHz. Conventional circuits, which are included in the system clock circuit 83, divide the primary clock signal 84 so as to produce another signal 86 having a frequency of only 700 KHz. By logic circuit techniques that are well known in the art, further signals 88, 90, each having 700 KHz frequency, and having different phase angles A and B respectively, are produced for use in controlling the changeover sequence.

Before a changeover sequence begins, command information flows from the command generator 58 of FIG. 3 into the bi-directional counter 66 of the controller 48 to control that servomechanism.

Turret selection is accomplished by miscellaneous machine function codes known as M codes, in the preferred embodiment. A code M24 is used to place the side turret under dynamic control and a code M25 selects the end turret for dynamic control, the unselected turret being controlled in a park mode of operation.

The M codes appear as binary coded decimal signals at terminals 96a of a units decoder 96 and at terminals 98a of a tens digit decoder 98, FIG. 5. Each decoder puts a logic zero or "low" signal on only one of each set of output terminals 96b, 98b. By means of two conventional logic gates 100, 102, simultaneous occurrence of a 2 signal from the tens digit decoder 98 and a 4 signal from the units digits decoder 96 results in a logic one or "high" output signal at an M24 output line 104. Similarly, a number 25 at the binary coded decimal input terminals 96a, 98a results in a high signal at at M25 terminal 106. M25 voltage signal that occurs upon an M25 command is shown in a graph of FIG. 4. The step-shaped increase 110 of voltage of the graph M25 represents a command to connect the dynamic controllers 44, 48 so that they control the U and W axes. At the same time the other two axes become unselected.

Upon a high signal on the M25 terminal 106, a "transfer request flip-flop" 112 is programmed, at one of its terminals 114, to produce a transfer request signal. The tranfer request signal is not produced, however, until the next occurring trailing edge of a pulse of the primary clock signal 84, following a change in an M24D or M25D command. This trailing edge starts a strobe signal 116, FIG. 4, which persists thereafter for at least 100 pulses of the primary clock signal 84. The strobe signal 116 actuates the transfer request flip-flop 112 to produce a high signal TR at a transfer request output terminal 118. The signal TR then inhibits the flow of commands from the command generator 58, by means of a terminal 58a. Curve 113 of FIG. 4 shows the TR signal.

Changeover of the controllers, however, must await the next-following occurrence of a zero in the error signal counter 70, simultaneously with a sufficiently small signal in the error signal counter 66, FIG. 3. A zero detector 120 produces a signal LHO when the data contents of the counter 70 become zero, this signal being applied to a logic NAND gate 122 of FIG. 5. Another detector 124 of FIG. 3 produces a signal LEROK whenever the longitudinal error in the counter 66 is small enough to be accommodated in the partial-range counter 70. The LEROK signal is applied to an input terminal of the NAND gate 122.

When all inputs of the NAND gate 122 are high, the NAND gate 122 conditions a logic device 126 which produces an output signal LTE upon the next following occurrence thereafter of a phase B clock signal 90 at a terminal C of the device 126. The LTE (longitudinal transfer enable) signal finally changes over the controller 48 from the Z-axis servo to the W-axis servo by triggering a flip-flop 128 whose output HZ controls the switching means 42. The flip-flop 128 is programmed in accordance with an M25 selection signal at one of its terminals 130.

The LTE signal is applied to a "load" terminal of the bi-directional counter 70 to enable the presetting of that counter through a set of data lines 132, FIG. 3, so that the counter 70 thereafter contains the error signal which had been in the other counter 66. An inverted LTE signal is applied to a one-shot multivibrator 134 to produce an RLC (reset longitudinal counter) signal which is employed to reset the counter 66 to zero. This occurs at the trailing edge of the LTE pulse, whose phase is phase B.

The trailing edge of the LTE pulse also actuates a "longitudinal transfer complete" flip-flop 136 to produce a signal designated as LTC, which resets the transfer request flip-flop 112. Upon termination of the high transfer request signal TR at the points 118 and 58a, command information is again able to flow from the command generator 58 into the error register 66 of the dynamic controller 48. The changeover has been completed.

The gain of the park controller's D/A 72 is very high, to insure that the park controller 50 will drive the parking error to zero so that changeover is possible.

Field effect transistor analog switches are used as portions 42a and 42c the switching means 72, for switching the outputs of the D/As. The switching time for a changeover is only one-half microsecond. Switches of this type are well known in the art. Fast transistor switches are employed for the digital switching means 42b and 42d.

During a changeover, command pulses from the control unit 58 are inhibited by the transfer request signal TR of the transfer request flip-flop 112. It should be noted that all command pulses are transmitted in synchronism with phase B of the clock signals, graph 90, and that all feedback pulses are transmitted in synchronism with the phase A clock pulses, graph 88. Since command pulses are inhibited during a changeover, and feedback pulses occur only during a phase A clock phase, changeover switching can be accomplished during a phase B clock phase interval without losing either a feedback pulse or a command pulse.

Circuits similar to those employed for the longitudinal Z and W axes that were described above are employed for the cross or transverse axes X and U. Similar logic devices 122′, 126′, 128′, 134′ and 136′ correspond respectively to the longitudinal circuit logic devices 122, 126, 128, 134, and 136, respectively. Thus, the logic circuits of FIG. 5 carry out the sequence of a mutual exchange or changeover of the controllers 48, 50 between the movable machine members 52, 78 in accordance with the present invention.

I claim:

1. A machine control apparatus comprising a movable member whose position is to be controlled; first and second servomechanisms for controlling said member; means for selectively connecting one or the other of said first and second servomechanisms to control said member, said first and second servomechanisms including respective first and second means for producing error signal data and respective first and second storage means for storing said error signal data; and transfer means for transferring said error signal data from said first storage means to said second storage means upon switching of the control of said member from said first servomechanism to said second servomechanism.

2. A machine control apparatus as defined in claim 1 and wherein at least one of said servomechanisms comprises command means for producing command signals representing desired movements of said member and means for entering said command signals into the respective means for producing error signal data, and wherein the respective means for producing error signal data comprises means for producing positional error signal data representing the difference between a desired position of said member and its actual position.

3. A machine control apparatus as defined in claim 1 and further comprising monitor means for monitoring the error signal data in said first storage means and for producing a control signal indicating whether or not the magnitude of the error signal is greater than a predetermined amount, and still further comprising means for inhibiting said switching means until said control signal indicates that said magnitude is not greater than said predetermined amount.

4. A machine control apparatus as defined in claim 3 and wherein said predetermined amount is zero.

5. A machine control apparatus comprising a plurality of movable members whose positions are to be controlled, a plurality of servomechanisms for controlling said members, switching means for selectively associating different ones of said plurality of servomechanisms to respectively control different ones of said movable members, each of said servomechanisms including respective means for producing error signal data for the associated member and respective storage means for storing said error signal data, and transfer means for transferring each of said respective error signal data from one of said storage means with which each member was previously associated to the storage means that is newly associated with the member upon switching of control of each of said members from a previously associated one of said servomechanisms to a newly associated one of said servomechanisms.

6. A machine control apparatus as defined in claim 5 and wherein each of said pluralities of movable members and servomechanisms comprises two of them.

7. A machine control apparatus as defined in claim 5 and wherein at least one of said means for producing error signal data comprises command means for producing signals specifying desired changes of position of an associated one of said movable members.

8. A machine control apparatus as defined in claim 5 and further comprising means for inhibiting said switching means when, prior to switching, the respective error signal data of one of said newly associated storage means is non-zero, and for enabling said switching means when, prior to switching, said respective error signal data is zero.

9. A machine control apparatus as defined in claim 5 and further comprising monitor means for monitoring the error signal data in at least one of said storage means and for producing a control signal indicating whether or not the magnitude of that error signal is greater than a predetermined amount, and still further comprising means for inhibiting said switching means until said control signal indicates that said magnitude is not greater than said predetermined amount.

10. A machine control apparatus as defined in claim 9 and wherein said predetermined amount is zero.

11. A machine control apparatus as defined in claim 5 and wherein each of said plurality of servomechanisms has input terminals for receiving digital input signals and comprises means for producing an analog output signal for controlling one of said members, and wherein said switching means comprises digital switching circuits and analog output switching circuits, said analog switching circuits comprising field effect transistor analog gates.

12. A machine control apparatus comprising a plurality of movable members whose positions are to be controlled, a plurality of servomechanisms for controlling said members, switching means for selectively associating different ones of said plurality of servomechanisms to respectively control different ones of said movable members, each of said servomechanisms including respective means for producing error signal data for the associated member and respective storage means for processing and storing said error signal data and transfer means for transferring each of said respective error signal data from a previously associated one of said storage means to a newly associated one upon switching of control of each of said members from a previously associated one of said servomechanisms to a newly associated one of said servomechanisms, whereby each of said respective data remains associated with the device to which the respective data relates, at least one of said plurality of servomechanisms having command means for producing successive signals for commanding desired successive movements of the member currently associated therewith, and at least one other of said plurality of servomechanisms having means for maintaining the member with which it is currently associated in a fixed position.

13. A machine control apparatus as defined in claim 12 and wherein the storage means that is included in one of said servomechanisms has greater data storage capacity than does the storage means that is included in another of said servomechanisms, and wherein said transfer means comprises means for detecting whether or not the pre-transfer error signal data in said storage means having greater capacity is small enough to be accommodated in its destination storage means of lesser capacity and further comprises means for inhibiting the switching when said pre-transfer error signal data cannot be so accommodated.

14. A machine control apparatus as defined in claim 12 and wherein said storage means comprises means for storing error signal data indicating a difference between a desired position and the actual position of the respective device, and wherein said transfer means comprises zero-detector means for ascertaining whether or not said error signal data in at least one of said storage means is zero and means for producing a signal inhibiting switching when not zero.

15. A machine control apparatus as defined in claim 14 and wherein said transfer means further comprises means for detecting whether or not the pre-switching error signal data in another of said storage means is small enough to be accommodated in the destination storage means with which said zero detector means is associated, and means for producing a control signal inhibiting switching when said preswitching error signal data cannot be so accommodated.

16. A machine control apparatus comprising a movable member whose position is to be controlled, first and second servomechanisms for alternatively controlling said member, means for producing command signals indicating changes in a desired position of said member, means for producing feedback signals indicating movements of the actual position of said member, switching means for selectively connecting said first and second servomechanisms to control said member, said first and second servomechanisms including storage means receiving said command signals and said feedback signals for producing and storing error signal data representing a difference between the actual and the desired positions, timing means generating a cyclical signal having first and second phase intervals within each cycle, means for gating said command and feedback signals into said storage means during said first and second phase intervals respectively, means for inhibiting production of said command signals during a switching of control from said first to said second servomechanisms, and means for actuating said switching during said first phase interval, whereby errors due to overlapping occurrence of said feedback and command signals are avoided.

17. A method for switching the controlling of a movable member of a machine from a first to a second servomechanism having first and second respective registers for respective error signals comprising the steps of a. producing a changeover request signal,
b. switching said member from said first to said second servomechanism, and
c. upon said switching, presetting into said second register an error signal equal to the error signal that was in said first register immediately prior to said switching.

18. A method for switching the controlling of a movable member as defined in claim 17 and further comprising, after the first step, the two additional steps of monitoring the error signal in said first register and producing a control signal indicating whether or not the magnitude of said error signal is greater than a predetermined amount, and inhibiting said switching until said control signal indicates that said magnitude is not greater than said predetermined amount.

19. A method for switching the controlling of a movable member as defined in claim 18 and wherein said predetermined amount is zero.

20. A method for switching the controlling of first and second movable members of a machine from first and second servomechanisms respectively to said second and first servomechanisms respectively, said first and second servomechanisms having first and second respective registers for first and second respective error signals, comprising the steps of a. producing a changeover request signal, b. monitoring said first error signal and producing a control signal when said first error signal is zero, c. switching said first and second members so as to be controlled respectively by said second and first servomechanisms when said control signal indicates that said first error signal is zero, d. upon said switching, presetting into said first register an error signal equal to the error signal that was in said second register immediately prior to said switching, and e. upon said switching, resetting said second register to zero error signal.

\* \* \* \* \*